United States Patent [19]
Mattinger et al.

[11] Patent Number: 5,138,245
[45] Date of Patent: Aug. 11, 1992

[54] HOLDER FOR A RECHARGEABLE TOOL

[75] Inventors: Detlef Mattinger, Bickenbach; Karl Trinkaus, Darmstadt, both of Fed. Rep. of Germany

[73] Assignee: Wella Aktiengesellschaft, Darmstadt, Fed. Rep. of Germany

[21] Appl. No.: 682,583

[22] Filed: Apr. 8, 1991

Related U.S. Application Data

[62] Division of Ser. No. 347,331, May 3, 1989, Pat. No. 5,030,902.

[30] Foreign Application Priority Data

May 11, 1988 [DE] Fed. Rep. of Germany ....... 3816070
Jul. 23, 1988 [DE] Fed. Rep. of Germany ....... 3825120

[51] Int. Cl.$^5$ ...................... H01M 10/46; B26B 7/00
[52] U.S. Cl. .................................. 320/2; 30/DIG. 1
[58] Field of Search ...................... 320/2; 30/DIG. 1

[56] References Cited

U.S. PATENT DOCUMENTS 3,379,952  4/1968  Tarrson ............................ 320/2
3,525,912  8/1970  Wallin ............................ 320/2 X
3,710,224  1/1973  Daniels ............................ 320/2

Primary Examiner—R. J. Hickey
Attorney, Agent, or Firm—Michael J. Striker

[57] ABSTRACT

The holder releasably receives and holds a rechargeable tool portion and is associated with a cable electrically connecting the tool portion for line-powered operation or battery-powered operation with a current source. The holder has a shell-like rest enclosing a lower portion of the tool portion and is structured to be changeable from a first configuration, in which the tool portion is supported by the holder and is removable for battery-powered operation, to a second configuration, in which the tool portion with the holder attached can be used for line-powered operation. The holder has a first leg extending longitudinally along a larger part of one side of the tool portion when the tool portion is in the holder, a second leg pivotally connected to one end of the first leg and acting as a supporting limb and a spreading spring connected to the second leg to urge the second leg from the first leg into a spread position so the tool portion and holder can stand together on a surface during battery charging. The second leg is provided with a plurality of catches engagable in cavities in the tool portion when the second leg is engaged with the first leg to form a compact structure together with the tool portion during line-powered operation.

8 Claims, 9 Drawing Sheets

HOLDER FOR A RECHARGEABLE TOOL

This is a division, of application Ser. No. 347,331 filed May 3, 1989, now U.S. Pat. No. 5,030,902.

BACKGROUND OF THE INVENTION

My invention relates to a mechanism for an electrical appliance and, more particularly, to a compact holder for a hair cutting task having a rechargeable battery powered by either line voltage or the battery.

To allow unrestricted mobility a hair cutting device with a built in rechargeable battery is used preponderantly in hair dressing which, when not in use, is inserted in a holder which simultaneously acts as a charging device. Furthermore spring-like contacts, on which the device being charged presses of its own weight, are provided in the holder. Current or power is supplied to the spring-like contacts from a power supply unit which is integrated in a line-powered power supply plug, so that the battery is subsequently charged.

Because of ergonomic considerations a hair cutting device should be both small and light which, of course, provides negative constraints on the life of the battery charge. It is especially important that on discharge of the battery during hair cutting the hairdresser has the option to continue to operate the unit.

SUMMARY OF THE INVENTION

Accordingly, it is an object of my invention to provide a mechanism for an electrical appliance which permits continuous operation of a tool portion of an electrical appliance powered by a rechargeable battery when the battery charge is substantially absent or nonexistent, but without troublesome and time-consuming manipulations.

This object and others, which will be made more apparent hereinafter, is attained in a holder for a rechargeable tool portion having a rechargeable battery, means for line-powered operation, means for battery-powered operation and is associated with means for charging the rechargeable battery. The holder is structured to releasably hold the tool portion and is associated with a cable connectable electrically with a current source. The means for charging the rechargeable battery and the means for line-powered operation of the tool are electrically connectable separately by a switching means to the current source via the cable. The tool portion is removably from the holder and detachable from the cable for battery-powered operation.

According to the invention, the holder has a shell-like rest enclosing a lower portion of the tool portion and has spring contacts located to cooperate with the tool portion so the means for line-powered operation and the rechargeable battery of the tool portion are electrically connectable with the current source via the cable when the tool portion sits in the holder. The holder is structured to be substantially reversibly changeable from a first configuration, in which the tool portion is conveniently supported by the holder on an accessible surface, to a second compact configuration, in which the tool portion with the holder and cable attached can be used for the line-powered operation.

The holder comprises the shell-like rest for supporting and enclosing the lower portion of said tool portion, a first leg extending longitudinally along a larger part of one side of the tool portion when the tool portion sits in the holder, a second leg pivotally connected to one end of the first leg and acting as a supporting limb, and a spreading spring connected to the second leg to urge the second leg acting as a supporting limb from the first leg so that the holder can stand on a surface. The second leg is also provided with a plurality of catches engagable with the tool portion in cavities thereof when the second leg is placed against the first leg in the second configuration.

Advantageously the tool portion is provide with a first catch cavity in the vicinity of a pivotal connection between the first leg and the second leg and also is provided with a second catch cavity adjacent a central portion of the first leg. The catches are engagable int he catch cavities when the holder is in the second configuration, so that the tool portion can be line-powered with the compact holder attached, while still being easily held in one hand.

The holder can also be provided with spring contacts cooperating with a means for charging the battery connected to the cable and located in the holder.

Several other embodiments of our invention are also possible which are described in detail in the following specific description, however the details of these embodiments presented in the following are not to be construed as limiting the appended claims which set forth the scope of our invention.

BRIEF DESCRIPTION OF THE DRAWING

The objects, features and advantages of my invention will be made more apparent from the following detailed description, reference being made to the accompanying drawing in which.

DETAILED DESCRIPTION OF THE INVENTION

Figure 1:
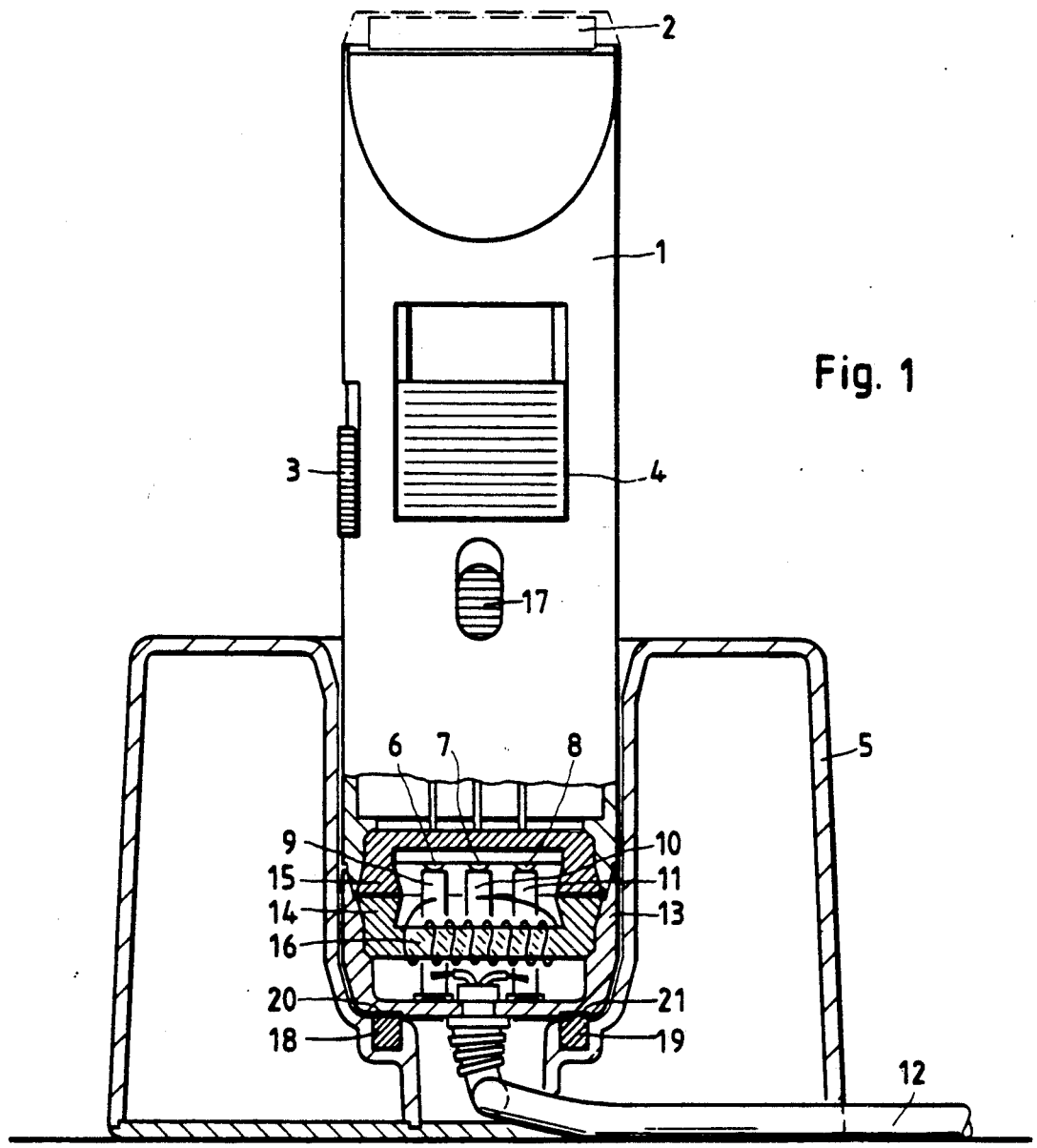
FIG. 1 is a side elevational view of a first embodiment of an electrical mechanism for an electrical appliance according to our invention.

The same parts in the different embodiments shown in the drawing are given the same reference numbers.

In the embodiment according to FIG. 1 a hair cutting device or tool portion 1 is provided in a known way with a cutting head 2, an on/off switch 3 and a mechanism 4 for adjustment of the cutting length. An unshown(in FIG. 1) motor and rechargeable battery for supply of the electrical energy needed for operation of the motor are located in the interior of the tool portion 1.

The tool portion 1 can be plugged in the holder 5 when the unit is not in use so that the contacts 6, 7 and 8 come into contact with the spring contacts 9, 10 and 11 so that the rechargeable battery 26 can be charged by a cable 12 from a current supply unit or power supply, which is not shown in FIG. 1.

To provide for line current operation when the battery is discharged, the spring contacts 9, 10 and 11 and the cable 12 are provided in an adapter 13, which can be removed from the holder 5 with the hair cutting device 1 as required. Thus the holder 5 has the form of an open ring so that the cable 12 can be similarly taken from the holder unit 5 with the adapter on withdrawal of the hair cutting device.

For locking of the adapter 13 a magnetic circuit is provided with the hair cutting device 1, which comprises two magnetic core halves 14,15. The magnetic core half 15 is mounted in the hair cutting device 1 and the magnetic core half 14 is mounted in the adapter 13 and is provided with an electrical coil 16. A current can flow through the coil 16 when a switch 17 of the hair cutting device 1 is properly set so that the core halves can be pulled together. The lower portion of the housing of the hair cutting device 1 and the upper edge of the adapter 13 overlap so that the adapter 13 is connected sufficiently rigidly with the hair cutting device 1 as long as the current flows through the coil 16.

So that the adapter 13 is not removed from the holder 5 on lifting the hair cutting device 1 because of the residual undesirable magnetism, permanent magnets 18,19 are provided in the embodiment according to FIG. 1, which act on anchor plates 20,21 in the adapter 13. The magnetic circuit can be formed so that by stray lines of force, which arise on energizing the coil 16, the force of the permanent magnets 18,19 is compensated.

Figure 2:
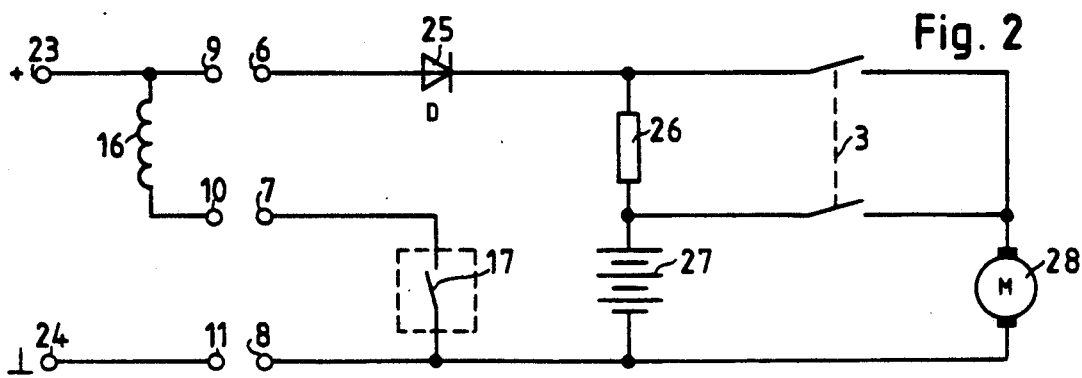
FIG. 2 is an electrical circuit diagram for the first embodiment of an electrical mechanism.
Figure 3:
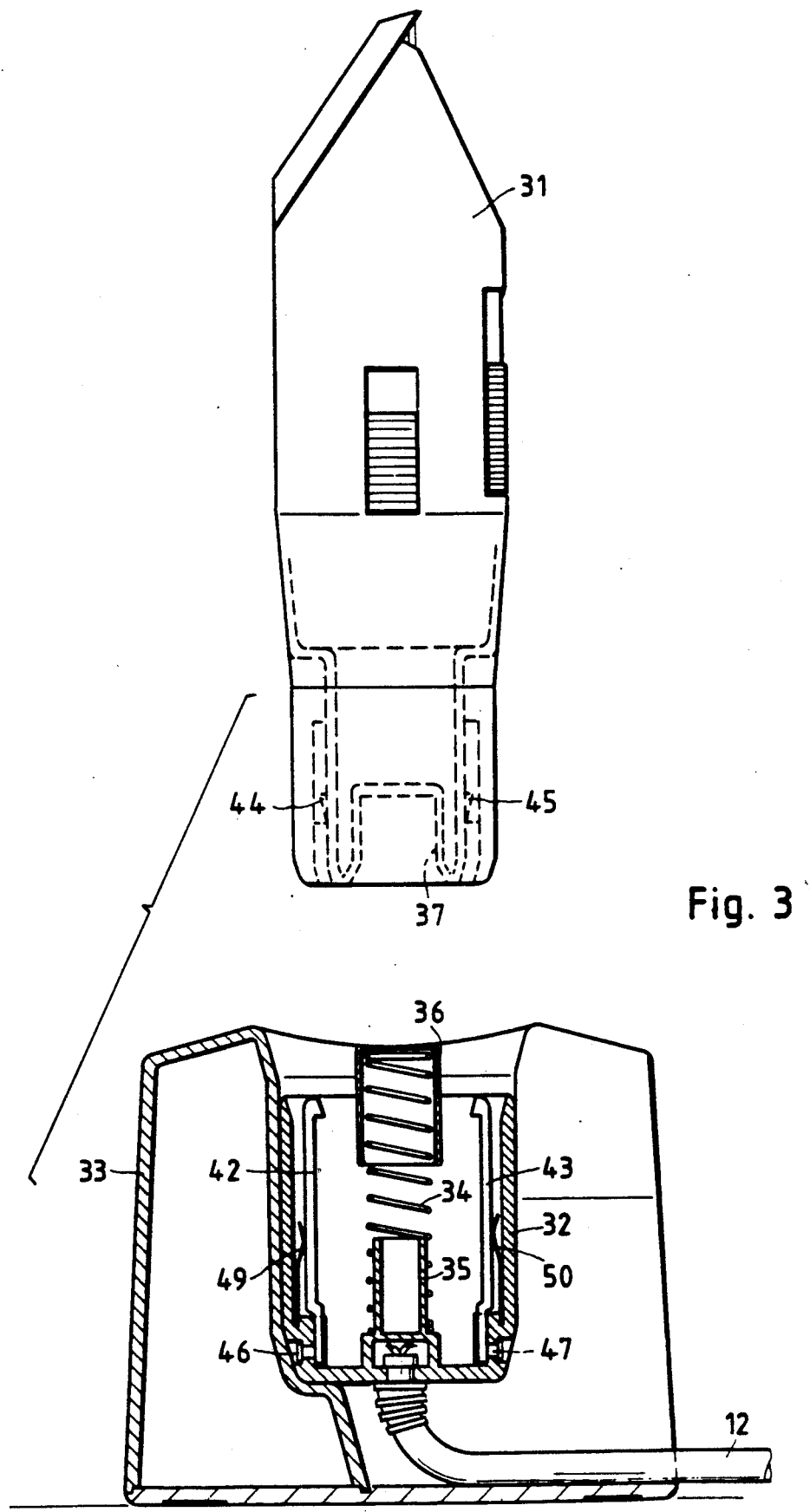
FIGS. 3 to 7 are partially side elevational, partially cross sectional views of a second embodiment of an electrical mechanism of an electrical appliance in different stages of operation.
Figure 4:
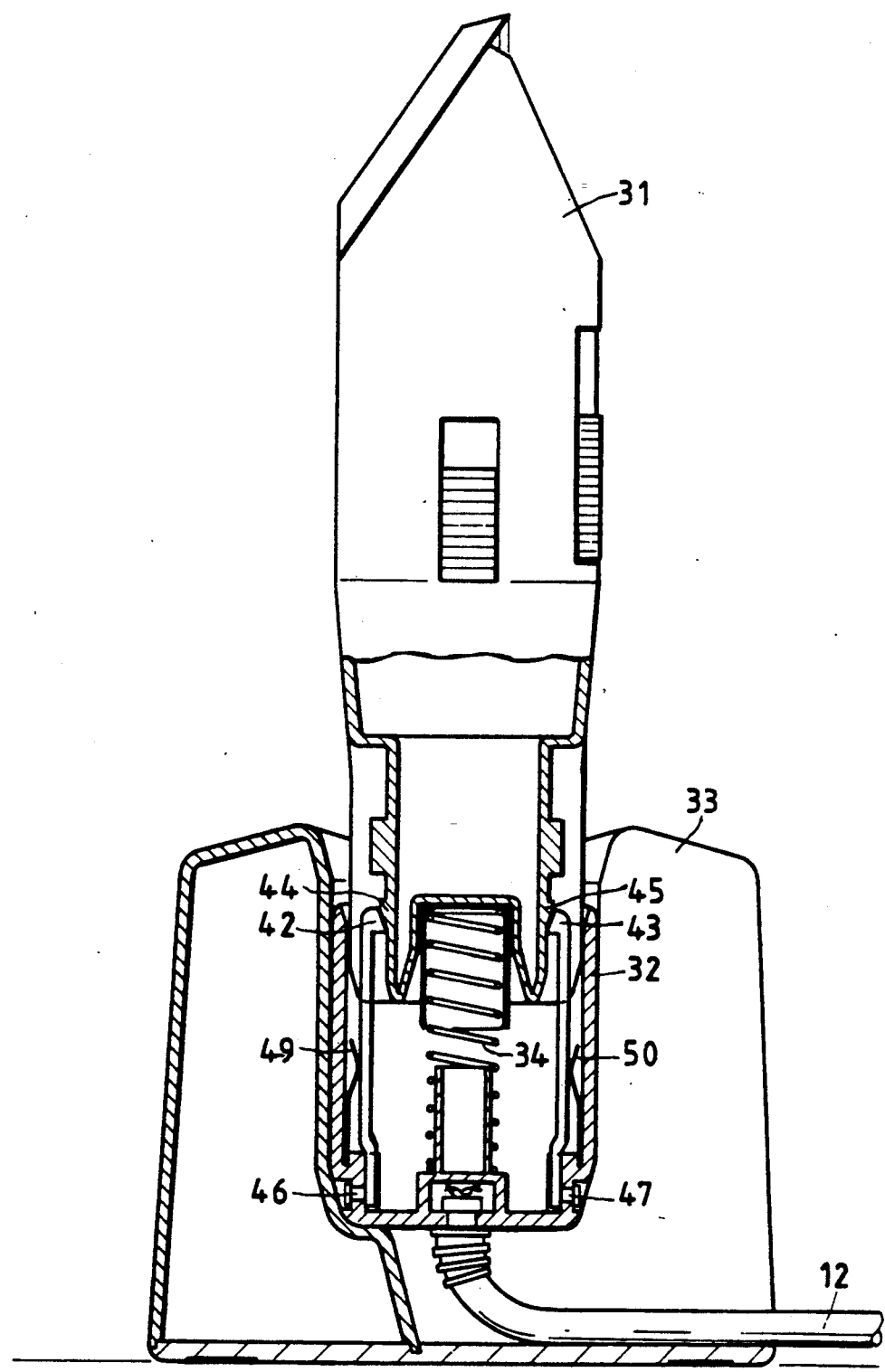

FIG. 2 shows a circuit diagram for the embodiment according to FIG. 1. Thus an equal voltage is fed over the strands of the cable 12 to the terminals 23,24 from the unshown power supply unit(FIG. 1). The coil 16 is connected between the terminal 23 and the spring contact 10 and obtains current through the contacts 7,8 and the switch 17, if the adapter should be connected with the hair cutting device mechanically. The battery is charged through a diode 25 which serves as a polarity protection and a resistance 26. The diode 25 also acts as a protection for short circuits in making contact and for discharge of the battery 27 through the internal resistance of the power supply unit in a power outage or with a pulled out power plug. A double-pole switch 3 energizes the motor 28. Thus it is guaranteed that the motor 28 is directly connected with the battery 27 during battery-powered operation and is connected directly, which means without interposition of the charging resistor 26, with the line voltage through the diode 25 during line voltage operation of the hair cutting device 1.

Figure 5:
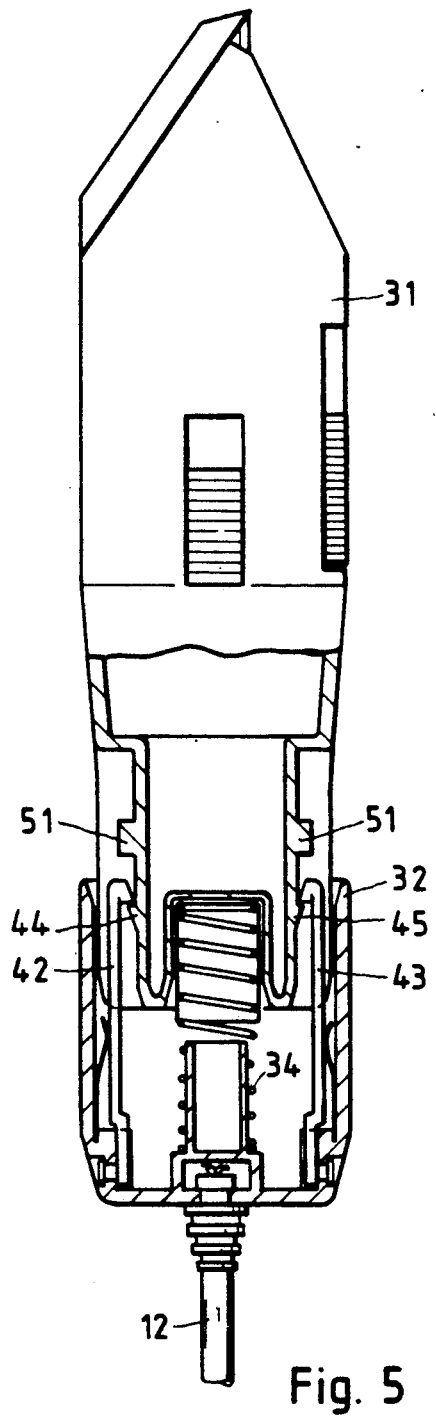
Figure 6:
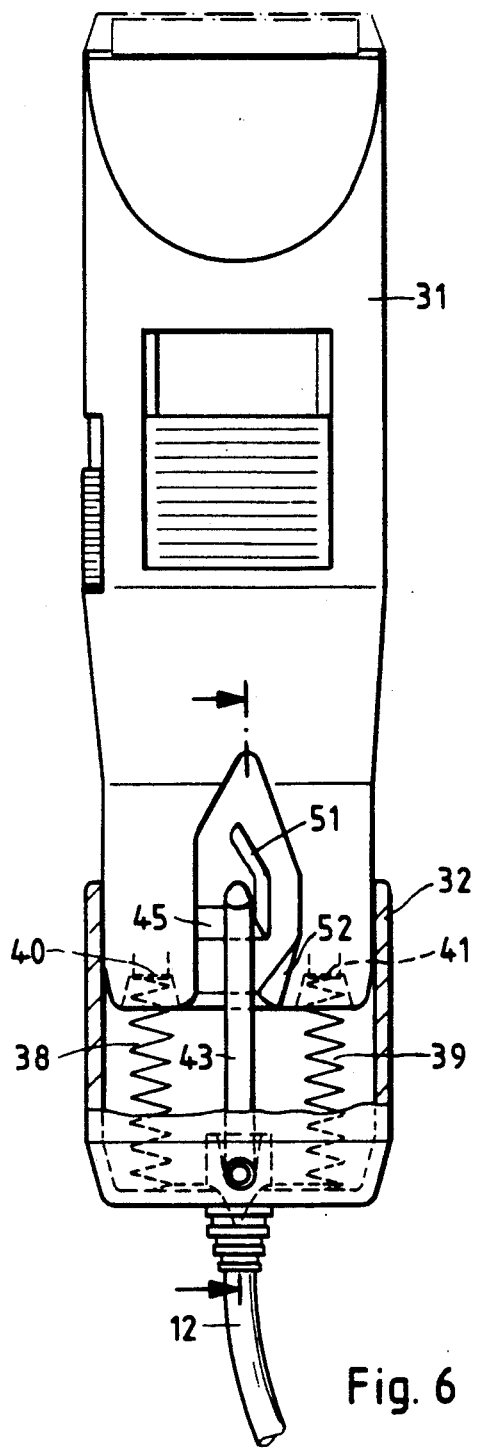
Figure 7:
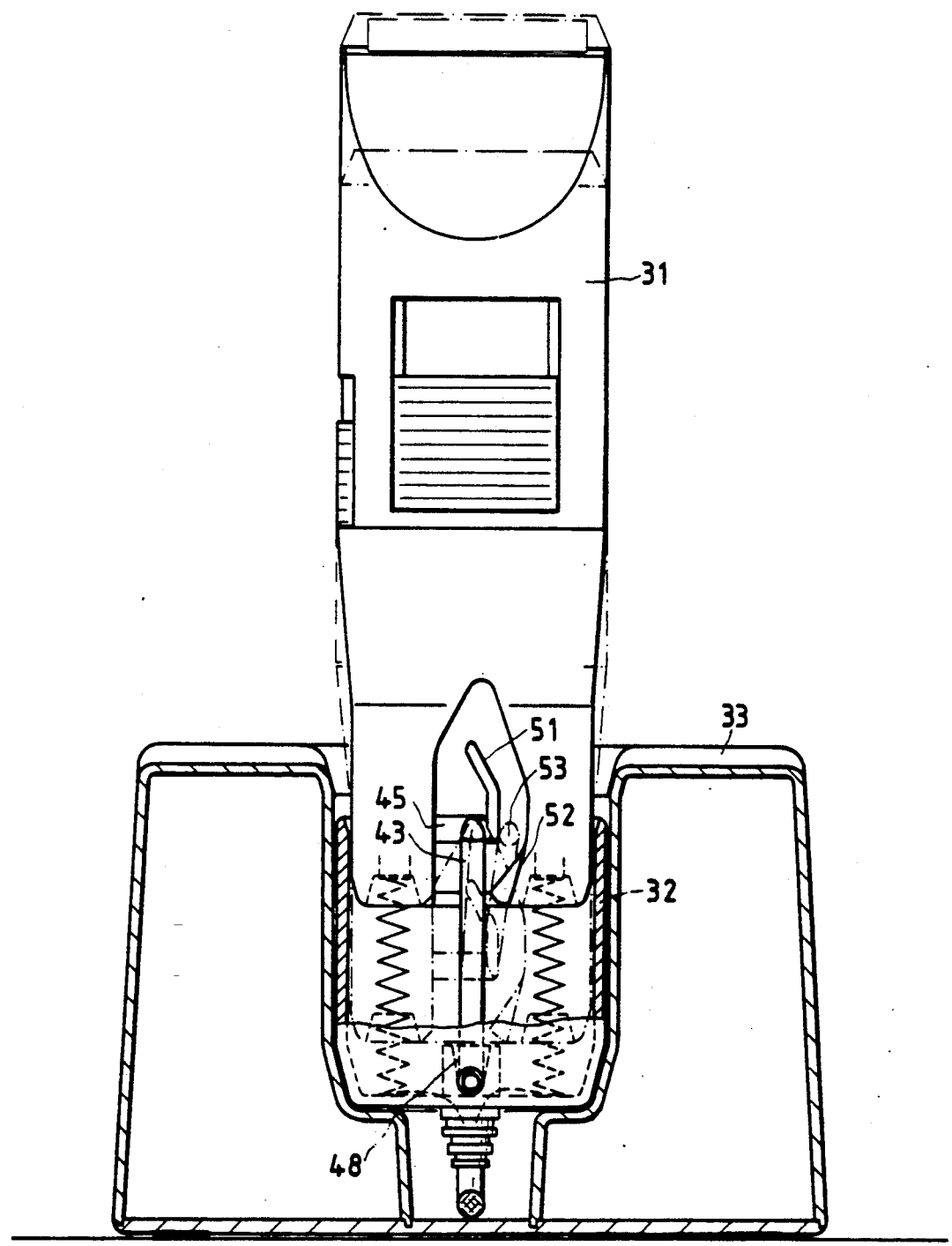

In the embodiment according to FIGS. 3 to 7 an axial adapter coil spring 34, which is guided partially by a pipe 35, is mounted in the adapter 32, which is adjusted in its outer form to a holder 33 and the hair cutting device 31. The upper portion of the adapter coil spring 34 is provided with a cap 36. A recess 37, in which the cap 36 engages when the hair cutting device 31 is set in the holder, is located on the lower end of the hair cutting device or tool portion 31. The adapter coil spring 34 is compressed by action of the force of gravity on the hair cutting device 1, until it takes the position shown in FIG. 4. Two additional coil contact springs 38,39 ar provided for electrical contact. These coil contact springs 38,39 rest on contacts 40,41 of the hair cutting device 31 and are connected with strands of the cable 12(FIG. 6).

Two snap catches 42,43 connect the adapter 3 with the hair cutting device 31 mechanically. Two inclined surfaces 44,45 are located on the hair cutting device 1, over which the snap catches 42,43 which are correspondingly inclined slide, when the hair cutting machine is pressed further downwardly. As soon as the snap catches 42,43 lock in behind the inclined surfaces 44,45, the adapter 32 is locked with the hair cutting device 1( FIG. 5 and FIG. 6 ).

The snap catches 42,43 are pivotally mounted in the adapter 32 at points 46,47 so that the pivot angle is bounded by an appropriate notched piece 48. Moreover the leaf springs 49,50 press on the snap catches 42,43.

As seen from FIGS. 5 and 6 the hair cutting device 31 together with the adapter 32 can be removed from the holder 33 and can be operated with the adapter connected. Should the hair cutting device 31 be operated again without the adapter after successful charging of the battery, the hair cutting device again is pressed into the holder 33 (as shown with dot-dashed lines in FIG. 7) and discharges until the weight of the hair cutting device acts on the springs. Thus by the two raised guide members 51,52 the snap catch 43(and/or 42) is guided about the lock stud formed by the inclined surfaces 45 and/or 44 and occupies temporarily the position 53 of the snap catch 43 shown with dot-dashed lines.

A power supply unit 61, which is connected by the cable 12 with the adapter 62, integrated in a power supply plug is provided in the embodiment according to FIGS. 8 to 11. Like the adapters of the previous embodiments this adapter 62 is fit into a holder cavity 63 of a holder 64. Spring contacts 65 act as electrical connection means for the cable 12 with the contacts 66 of the hair cutting device 67. For mechanical connection of the adapter 62 with the hair cutting device 67 a ring-like shoulder 68 is provided on one side under the hair cutting device 67, to which the upper edge 69 of the adapter 62 connects.

Figure 9:
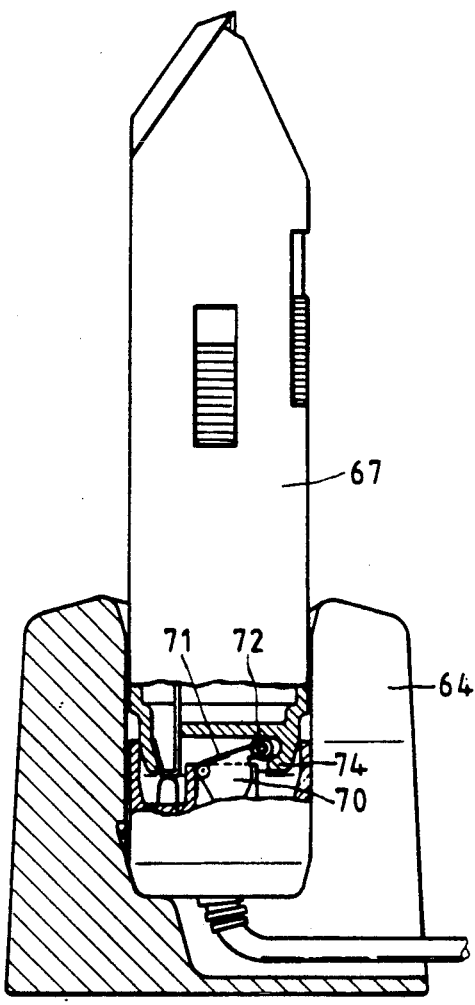
Figure 10:
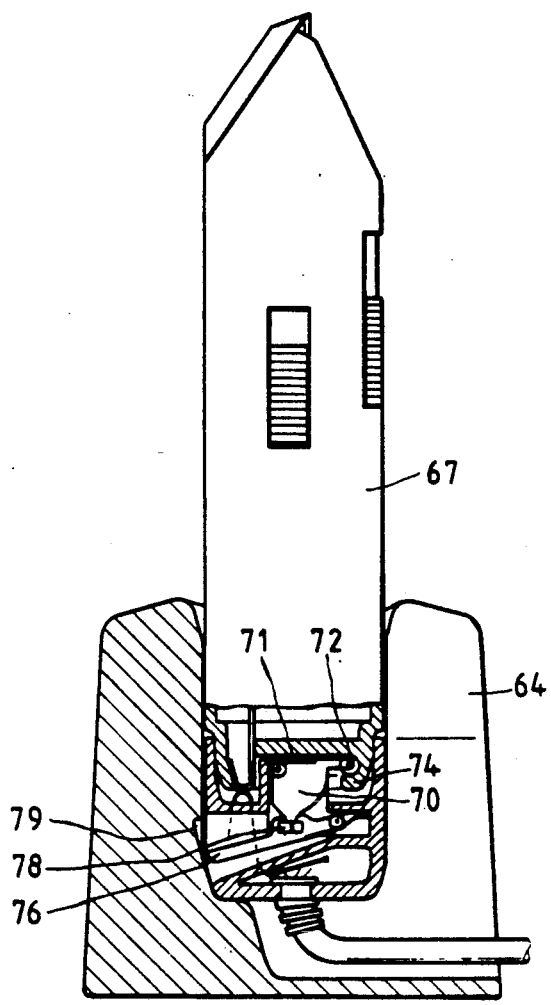

Further a known mechanical two-state device 70 is located in the adapter 62, which has a prime lever 71, whose end is provided with a roller 72. The prime lever 71 is pivotable about a pivot point 73 and can take the position shown in FIGS. 8 and 9 or the position shown in FIG. 10. The prime lever 71 is held in the position shown in FIG. 8 by a spring member at the pivot point 73. The prime lever 71 is advantageously a metal cast piece. The portion carried adjacent the roller 72 has a second portion which ends in a pin 75. On pivoting of the prime lever 71 in a clockwise direction this second portion comes to rest on the locking lever 76, presses it downwardly and locks in a recess 78 of the locking lever 76(FIG. 10). The locking lever 76 is brought by the spring element 77 into the position shown in FIG. 8 when the pin 75 is not engaged on the locking lever 76.

Figure 8:
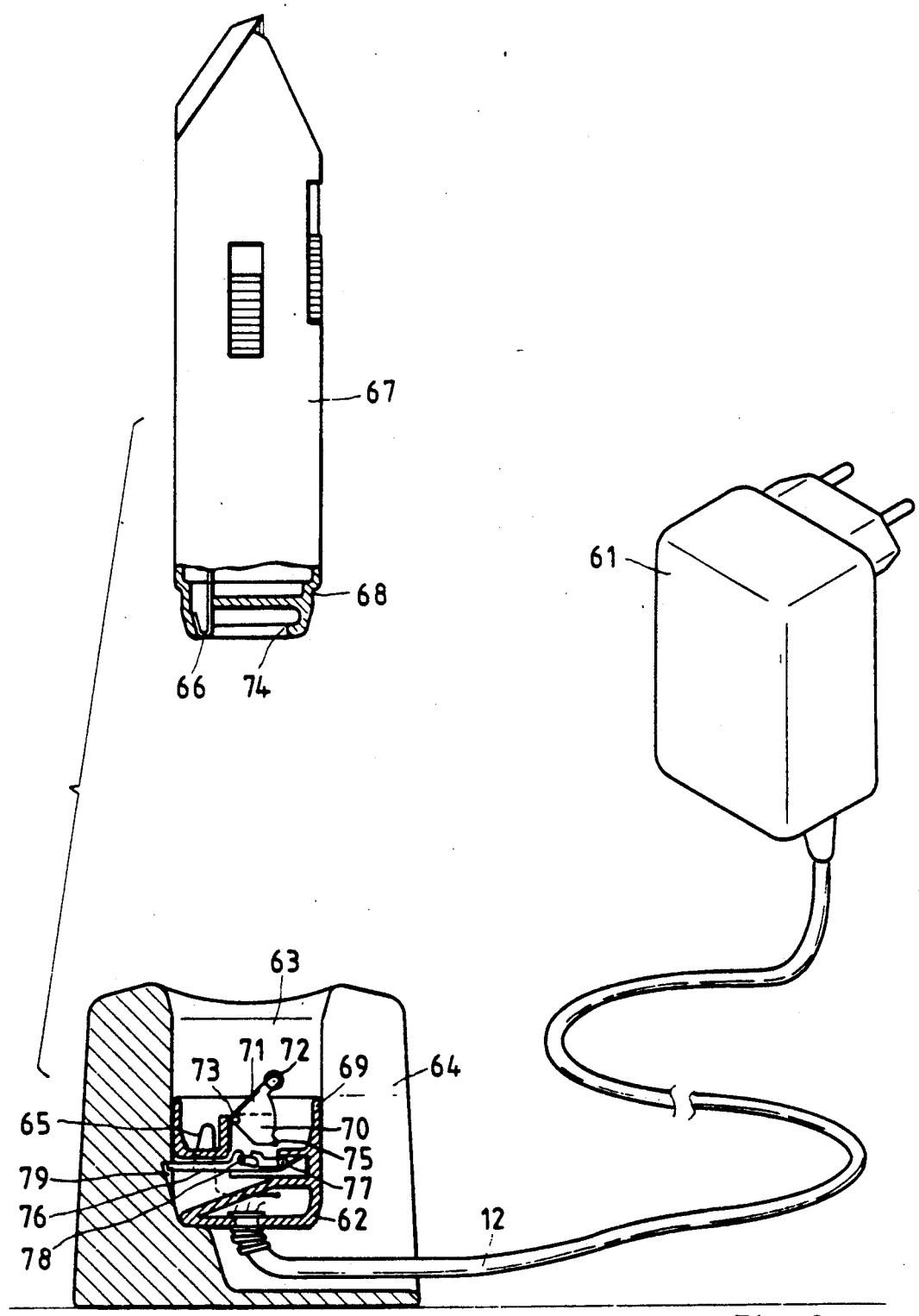
FIGS. 8 to 11 are partially side elevational, partially cross sectional views of a third embodiment of an electrical appliance in different stages of operation.

In the position shown in FIG. 8 the end of the locking lever 76 engages in a recess 79 of the holder 64, while the locking lever 76 is outside of the recess 79 in the position illustrated in FIG. 10.

From the position shown in FIG. 8 when the hair cutting device 67 is put in place the prime lever 71 is forced downwardly—however without that the pin 75 operates the locking lever 76. When the hair cutting device 67 is again taken the roller 72 remains outside the undercutting formed by the projection 74, so that the hair cutting device 67 can be removed from the holder 64 without the adapter 62. Thus by inserting the locking lever 76 into the recess 79 it is guaranteed that the adapter 62 remains in the holder 64. FIG. 9 shows that position in which the lever is pressed downwardly by the weight of the hair cutting device 67, however the connected between the hair cutting device 67 and the adapter 62 is not yet locked.

If additional pressure is exerted downwardly on the hair cutting machine 67, the position shown in FIG. 10 is reached. The prime lever 71 is stopped then by the locking lever 76, so that the roller 72 engages in the undercutting of the hair cutting device 67 and thus the adapter 62 and the hair cutting device 67 are locked together with each other.

In the swung out position of the locking lever 76 the locking lever releases the adapter 62 in the holder 64. The hair cutting device 67 can be operated together now with the adapter removed from the holder 64 and with the line voltage.

For decoupling the adapter from the hair cutting device again a pressure is applied to the hair cutting device 67 so that the locking lever 76 pivots laterally(-vertical to the paper plane) and releases the pin 75 and thus the prime lever 71.

This type of bistable or two state devices are known from ball point pens or from electrical pressure sensors. In electrical pressure sensors a locking catch stamped from sheet metal similar to the locking lever 76, which is pivotable in two planes, is used. At a first pressure the locking catch is pivoted out into a first plane and locks a pin, which is provided on the moving portion of the pressure sensor In the second pressure the locking catch is moved into the other plane and again releases the pin by an inclined surface so that the pressure sensor is released.

In the position shown in FIG. 8 the hair cutting device 67 is operated with current from the battery. On setting it in the adapter 62 without special pressure(-FIG. 9) the spring contacts 65 rest on the contacts 66 so that the battery is supplied with current. The roller 72 slides past the projection 74 into the lower portion of the hair cutting device 67 so that the hair cutting device 67 is again taken from the holder 64 without the adapter 62.

Figure 11:
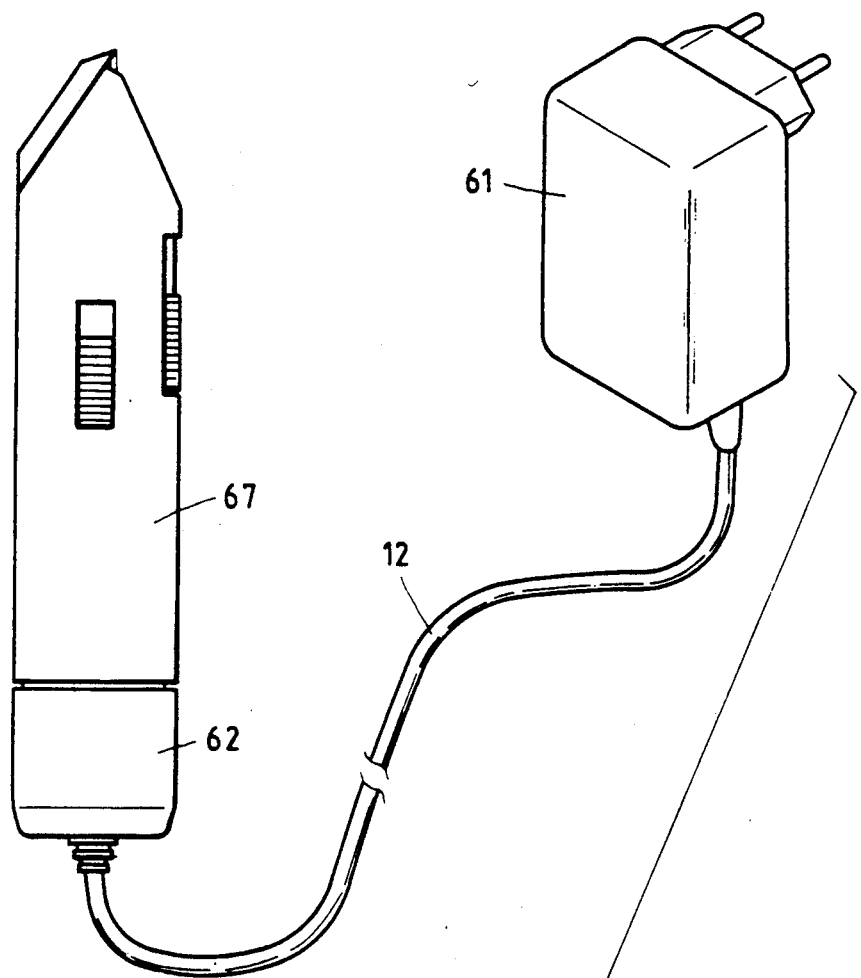
Figure 11:
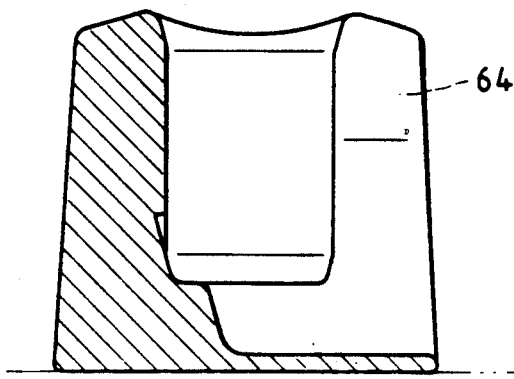

Because of the augmented pressure on the hair cutting device 67 the prime lever 71 comes to the position shown in FIG. 10 so that the roller 72 is moved behind the projection 74. So that the adapter 62 is locked with the hair cutting device 67 and can be removed with the holder 64 together with it(FIG. 11).

By the repeated pressure on the hair cutting device 67 the prime lever 71 again springs into the position shown in FIG. 9 so that the adapter remains in the holder 64 when the hair cutting machine is used next.

Figure 12:
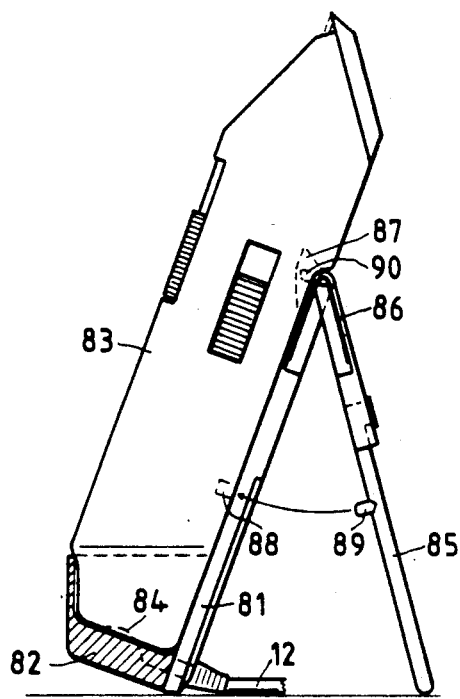
FIGS. 12 to 14 are a plurality of views of a fourth embodiment of our invention.
Figure 13:
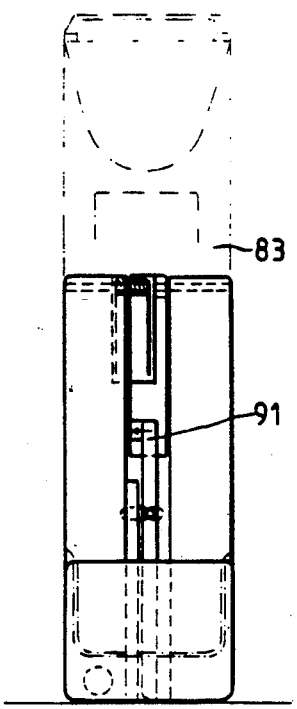
Figure 14:
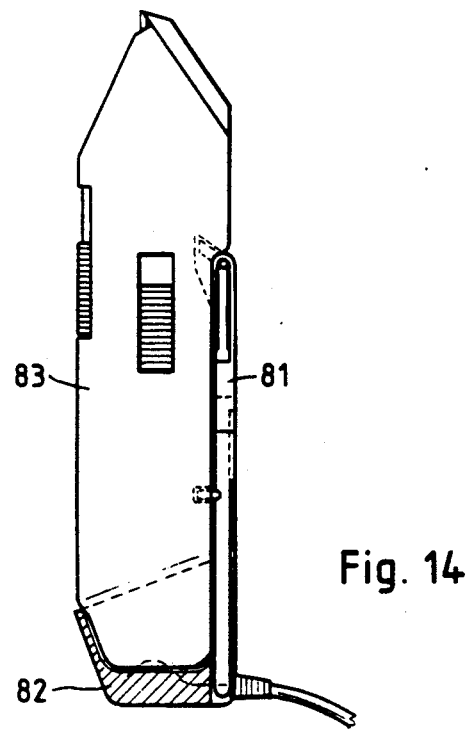

In the embodiment which is shown in FIGS. 12 to 14, the holder also acts as the adapter. A plate-like first leg 81 of the holder is provided with a shell-like rest 82 for its lower portion, which encloses the lower portion of the hair cutting device 83. Moreover the cable contains spring contacts 84 for connection of the cable 12 with the unshown contacts of the hair cutting device 83. A second leg 85 is pivotally mounted on a first leg 81 and forms a supporting limb, which is spread apart from the first leg 81 by a spreading spring 86 engaging against an unshown stop.

Two catch cavities 87,88 are provided on the side of the hair cutting device 83 facing the first leg 81. The position of the holder shown in FIG. 12 allows a removal of the hair cutting device 83 from the holder and battery operation. Should it be desired, because of a reduced charge on the battery, to provide the hair cutting device 83 with current by cable 12 in operation, then the hair cutting device 83 including the holder is grasped in such a way that the supporting limb 85 is pivoted in the direction of the first leg 81. Thus a catch 89 located on the supporting leg 85 comes into a catch cavity 88 so that the hair cutting device 83 can not be slid upwardly from the shell-like rest 82. Additionally a lever 90 connected with the supporting limb is pivoted inside the catch cavity 87 in such a way that it prevents a removal of the hair cutting device 83 from a first leg 81. Thus the holder is rigidly attached with the hair cutting device 83, which is operated then with voltage from the power supply unit.

To prevent the breaking of the lock or connection between the tool portion and the holder because of loosening of the supporting leg 85, the supporting limb 85 can be pushed in the direction of the arrow 91 toward the first leg 81, so that a corresponding projection of the supporting leg 85 projects into a recess of the first leg 81 and the supporting leg locks.

The tool portion of the electrical appliance by definition comprises hair cutting device 1 in the above-described embodiments of our invention.

It will be understood that each of the elements described above, or two or more together, may also find a useful application in other types of constructions differing from the types described above.

While the invention has been illustrated and described as embodied in an electrical connection between a circuit board and a hybrid circuit structure and process for making same, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of the prior art, fairly constitute essential characteristics of the generic or specific aspects of this invention.

What is claimed is:

1. In a holder for a rechargeable tool portion, said tool portion containing a rechargeable battery, means for line-powered operation and means for battery-powered operation, said holder being structured to releasably hold said tool portion and being associated with a cable connectable electrically with a current source, each of said rechargeable battery and said means for line-powered operation being electrically connectable to the current source via the cable, and said tool portion being removable from the holder for said battery-powered operation by said means for battery-powered operation, the improvement wherein said holder is structured to enclose and provide a reset for a lower portion of said tool portion and has a plurality of spring contacts, said spring contacts being located to cooperate with said tool portion so said means for line-powered operation and said rechargeable battery of said tool portion are electrically connectable with said current source via said cable when said tool portion sits in said holder, and wherein said holder has a first leg extending longitudinally along a larger part of one side of said tool portion when said tool portion is engaged with said holder, a second leg pivotally connected to said first leg and acting as a supporting limb, and a spreading spring connected to said second leg so as to urge said second leg from said first leg into a spread position, said second leg being provided with a plurality of catches engagable in said tool portion when said second leg is placed against said first leg, so that said holder is changeable against the action of said spreading spring from a first configuration, in which said second leg is spread from said first leg by said spreading spring so that said tool portion can stand in said holder on a supporting surface and said rechargeable battery is connectable electrically with said current source for charging said rechargeable battery; to a second configuration, in which said second leg is engaged by said catches in said tool portion and said means for line-powered operation is connectable with said current source, so that said tool portion with said holder and attached cable can be used for said line-powered operation.

2. The improvement defined in claim 1, wherein said first leg is pivotally connected to said second leg at a pivotal connection located in the vicinity of one end of said first leg and one end of said second leg and said tool portion is provided with a first catch cavity in the vicinity of the pivotal connection and also is provided with a second catch cavity adjacent a central portion of said first leg.

3. The improvement defined in claim 1, said first leg has a recess extending substantially longitudinally for receiving said second leg, said recess being shaped and dimensioned to receive said second leg when said second leg is engaged in said tool portion.

4. The improvement defined in claim 3, wherein said first leg is pivotally connected to said second leg at a pivotal connection located in the vicinity of one end of said first leg and one end of said second leg and said second leg is moveable in a direction of an axis of the pivotal connection between said first leg and said second leg and said second leg is provided with another catch, said other catch being engagable with said first leg to hold said second leg in the vicinity of said first leg.

5. The improvement as defined in claim 1, wherein said tool portion is a hair cutting device.

6. In a holder for a rechargeable tool portion, said tool portion containing a rechargeable battery, means for line-powered operation and means for battery-powered operation, said holder being structured to releasably hold said tool portion on a surface in an orientation in which said tool portion is conveniently removable from said holder, and said holder also being associated with a cable connectable electrically to a current source, each of said rechargeable battery and said means for line-powered operation being electrically connectable to the current source via the cable, and said tool portion being removable from the holder and detachable from said cable for said battery-powered operation by said means for battery-powered operation, the improvement wherein said holder has a shell-like rest enclosing a lower portion of said tool portion and has a plurality of spring contacts, said spring contacts being located to cooperate with said tool portion so said means for line-powered operation and said rechargeable battery of said tool portion are electrically connectable with said current source via said cable when said tool portion sits in said holder, and said holder is structured to be changeable from a first configuration, in which said tool portion is supportable on said surface by said holder and said rechargeable battery is connectable electrically with said current source for charging, to a second configuration, in which said tool portion with said holder and cable attached can be used for said line-powered operation.

7. The improvement according to claim 6, wherein said holder comprises the shell-like rest, a first leg extending longitudinally along a larger part of one side of said tool portion when said tool portion is engaged with said holder, a second leg pivotally connected to said first leg and acting as a supporting limb, and a spreading spring connected to said second leg so as to urge said second leg from said first leg into a spread position so said holder can stand on said surface, said second leg being provided with a plurality of catches engagable in said tool portion when said second leg is located adjacent said first leg, and said tool portion is provide with a first catch cavity in the vicinity of a pivotal connection between said first leg and said second leg and also is provided with a second catch cavity adjacent a central portion of said first leg, said catches being engagable in said catch cavities when said holder is in said second configuration, so that said tool portion can be line-powered with said holder attached.

8. The improvement according to claim 6, wherein said tool portion is a hair cutting device.

* * * * *